United States Patent
Ozasa et al.

(10) Patent No.: US 8,188,672 B2
(45) Date of Patent: May 29, 2012

(54) HIGH-PRESSURE DISCHARGE LAMP SYSTEM AND PROJECTOR USING THE SAME

(75) Inventors: Minoru Ozasa, Kyoto (JP); Syunsuke Ono, Osaka (JP); Masahiro Yamamoto, Osaka (JP); Go Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 277 days.

(21) Appl. No.: 12/665,312

(22) PCT Filed: Jan. 27, 2009

(86) PCT No.: PCT/JP2009/000291
§ 371 (c)(1),
(2), (4) Date: Dec. 17, 2009

(87) PCT Pub. No.: WO2009/096166
PCT Pub. Date: Aug. 6, 2009

(65) Prior Publication Data
US 2010/0181926 A1  Jul. 22, 2010

(30) Foreign Application Priority Data
Feb. 1, 2008  (JP) .................................. 2008-022339

(51) Int. Cl.
*H05B 41/16* (2006.01)
*H01J 17/18* (2012.01)
(52) U.S. Cl. ........... 315/246; 315/56; 315/291; 313/623
(58) Field of Classification Search .................... 315/56, 315/59, 246, 291, 326; 313/567, 607, 623, 313/626
See application file for complete search history.

(56) References Cited

U.S. PATENT DOCUMENTS

| | | | |
|---|---|---|---|
| 6,294,870 B1 * | 9/2001 | Kawashima et al. | 313/623 |
| 6,693,379 B2 * | 2/2004 | Nishida | 315/56 |
| 7,329,992 B2 * | 2/2008 | Minamihata et al. | 313/607 |
| 2002/0101163 A1 * | 8/2002 | Kai et al. | 315/56 |

(Continued)

FOREIGN PATENT DOCUMENTS

| | | |
|---|---|---|
| CN | 1816894 A | 8/2006 |
| EP | 1 617 460 | 1/2006 |
| EP | 2 034 510 | 3/2009 |
| JP | 2003-317663 | 11/2003 |

(Continued)

OTHER PUBLICATIONS

Chinese Application No. 200980103764.0 Office Action issued by the Chinese Patent Office dated Jul. 11, 2001 with English translation.

*Primary Examiner* — Tung X Le

(57) ABSTRACT

A high-pressure discharge lamp system has a high-pressure mercury lamp 4 and a lighting circuit 3 that operates the lamp 4. The lamp 4 includes an envelope having a light emitting part 6 having a first and a second electrode 10, 11 arranged therein and a first and a second sealing part 7, 8 oppositely extending from the light emitting part 6, and a conductor 20 electrically connected to the second electrode 11. Particularly a portion of the conductor 20 is at least in contact with or in closest proximity to the outer surface of the first sealing part 7 substantially at a single point in an area corresponding to a first metal foil 16 connected to the first electrode 10. The circuit 3 activates the lamp 4 by placing high-frequency voltage at a predetermined frequency within a range of 10 [kHz]-10 [MHz], inclusive, between the electrodes 10, 11.

15 Claims, 11 Drawing Sheets

U.S. PATENT DOCUMENTS

| | | | |
|---|---|---|---|
| 2003/0127985 A1* | 7/2003 | Okamoto et al. | 313/594 |
| 2006/0108949 A1* | 5/2006 | Suzuki et al. | 315/291 |
| 2006/0197475 A1 | 9/2006 | Yamamoto et al. | |
| 2008/0258622 A1 | 10/2008 | Yamamoto et al. | |

FOREIGN PATENT DOCUMENTS

| | | |
|---|---|---|
| JP | 2006-236644 | 9/2006 |
| WO | 2004/090934 | 10/2004 |
| WO | 2007/138955 | 12/2007 |

* cited by examiner

[Fig. 1]
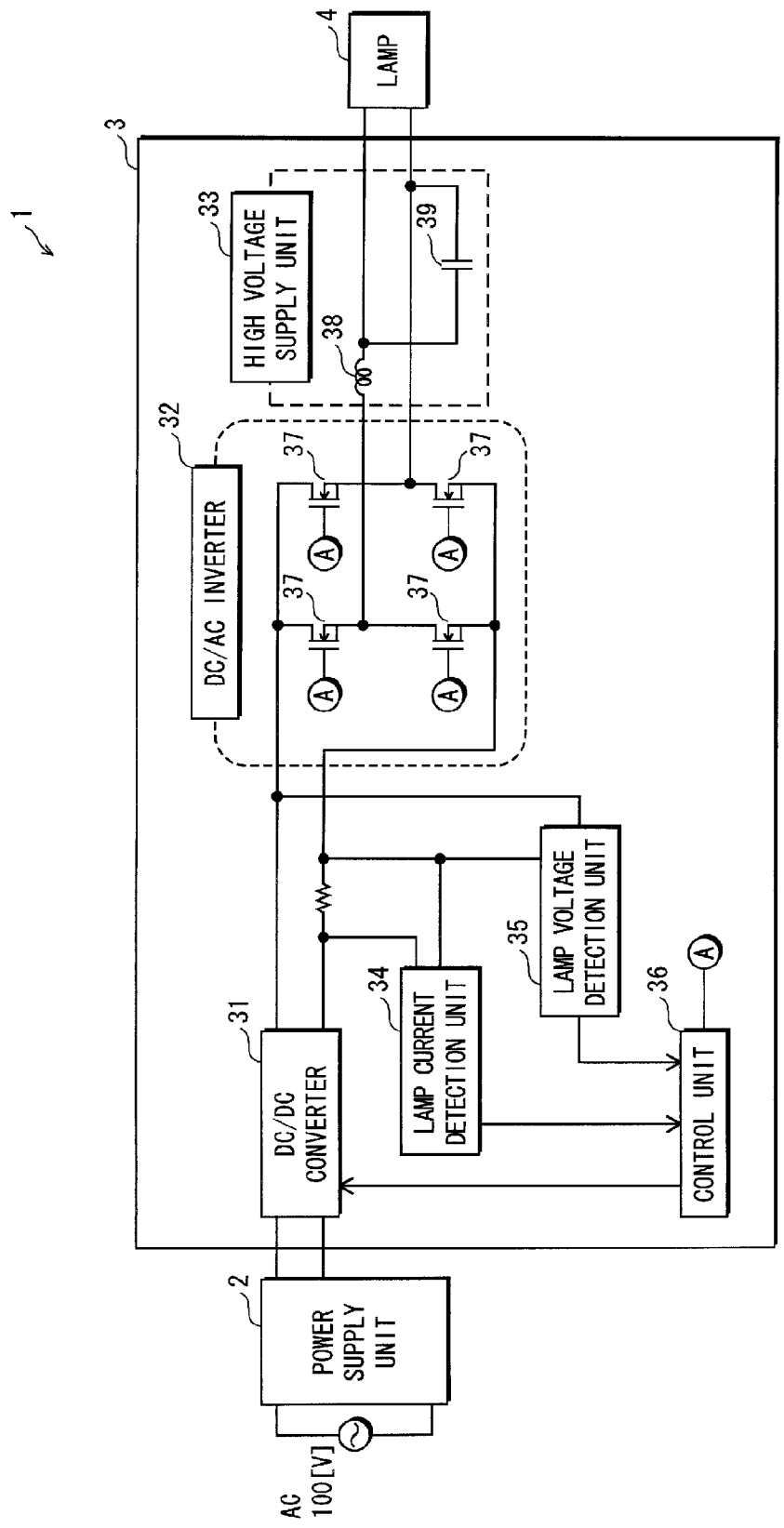

[Fig. 2]
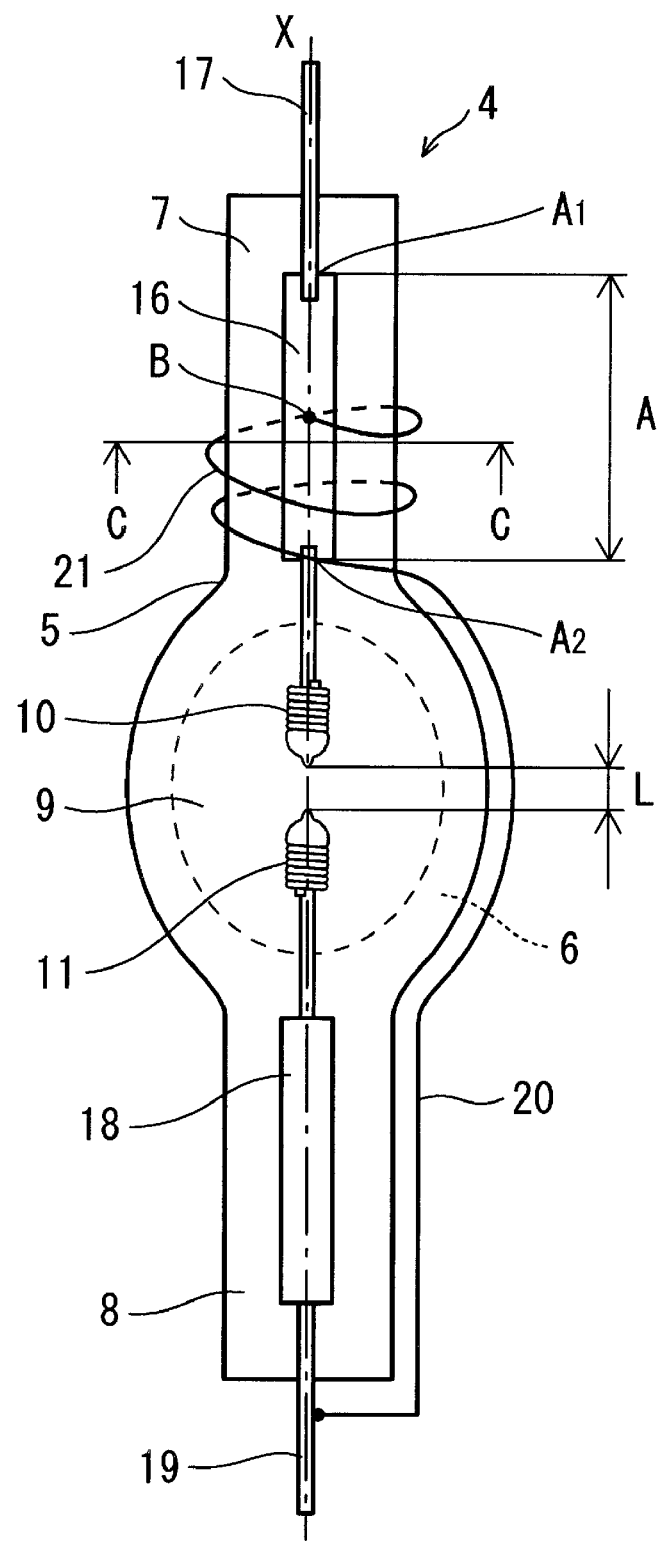

[Fig. 3]
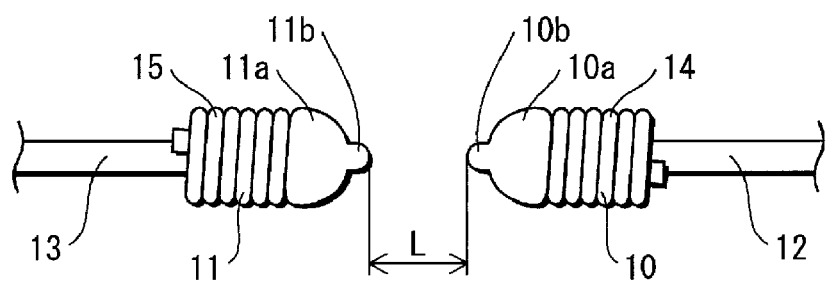
[Fig. 4]
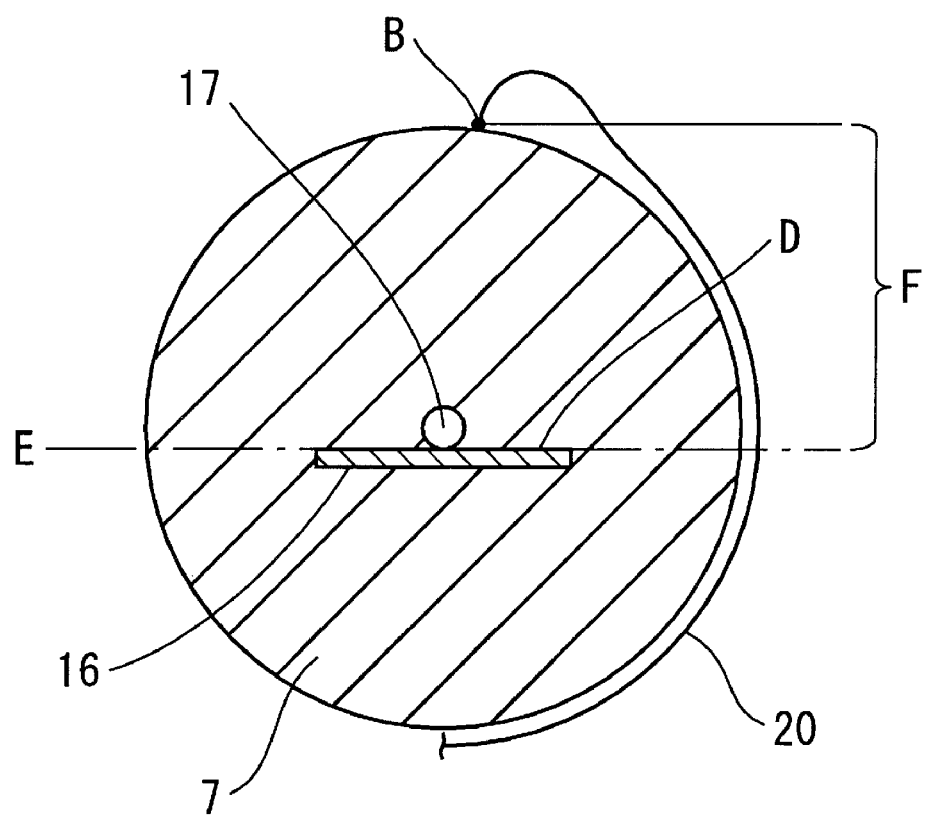

[Fig. 5]
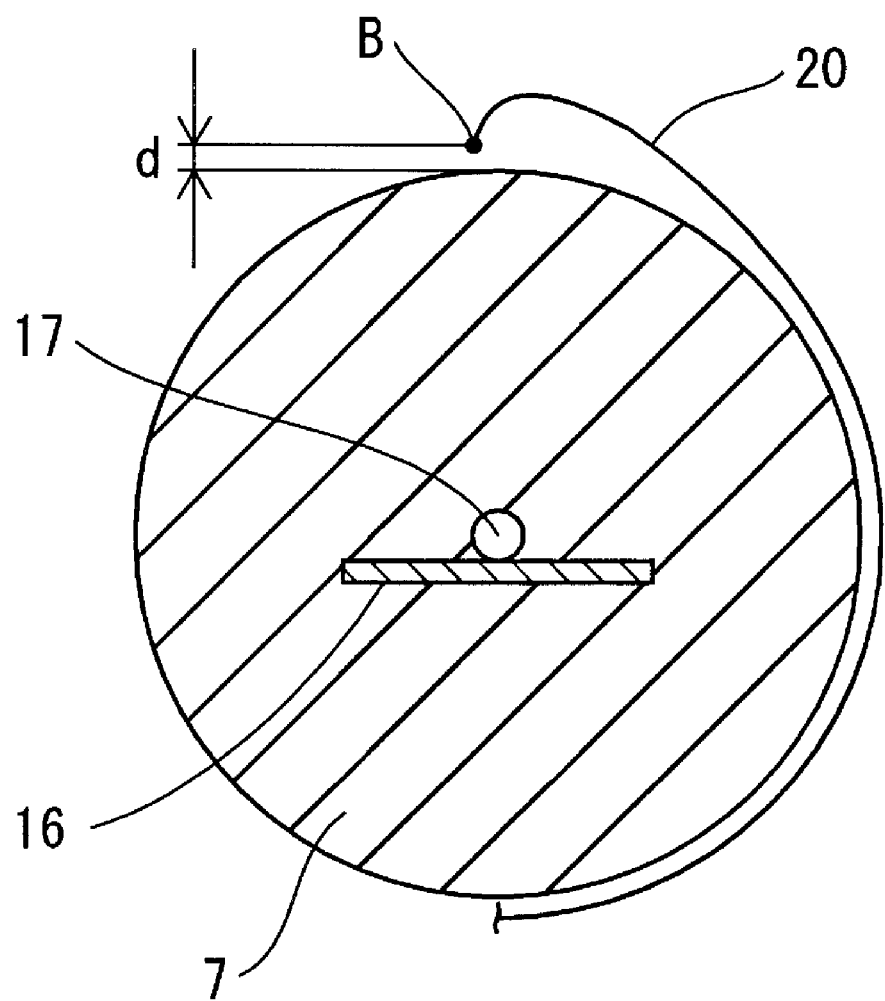

[Fig. 6]
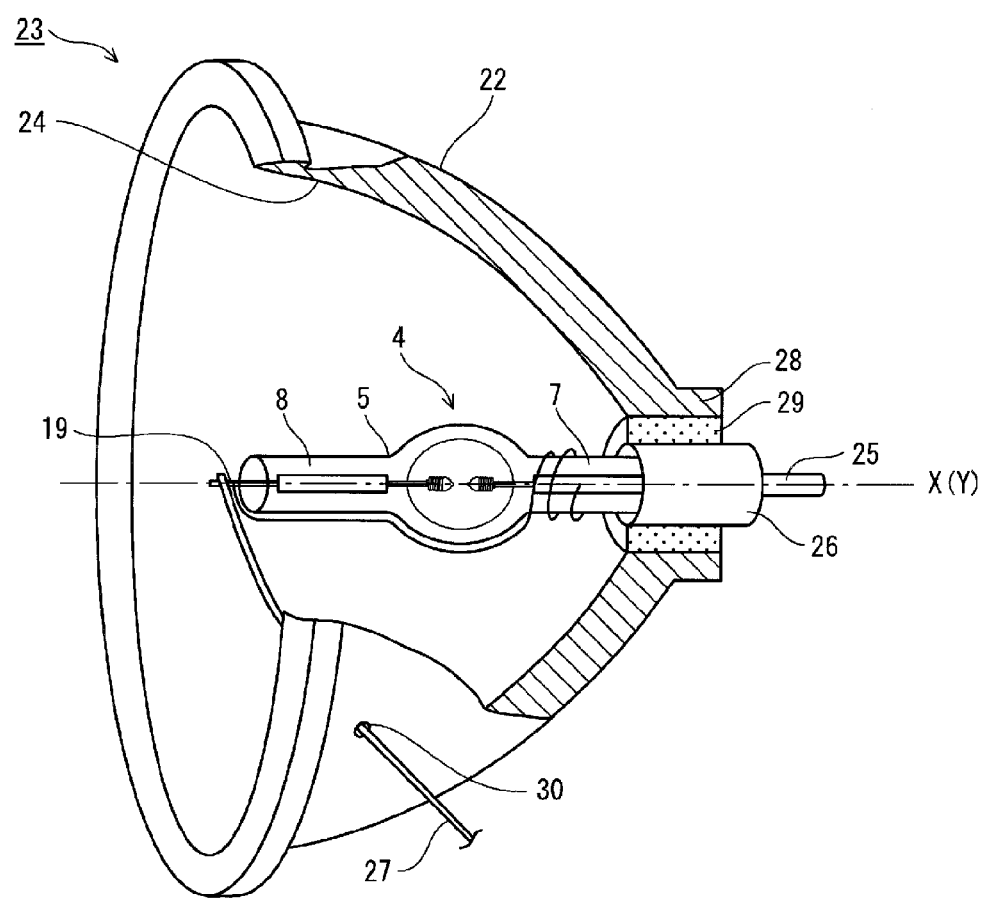

[Fig. 7]
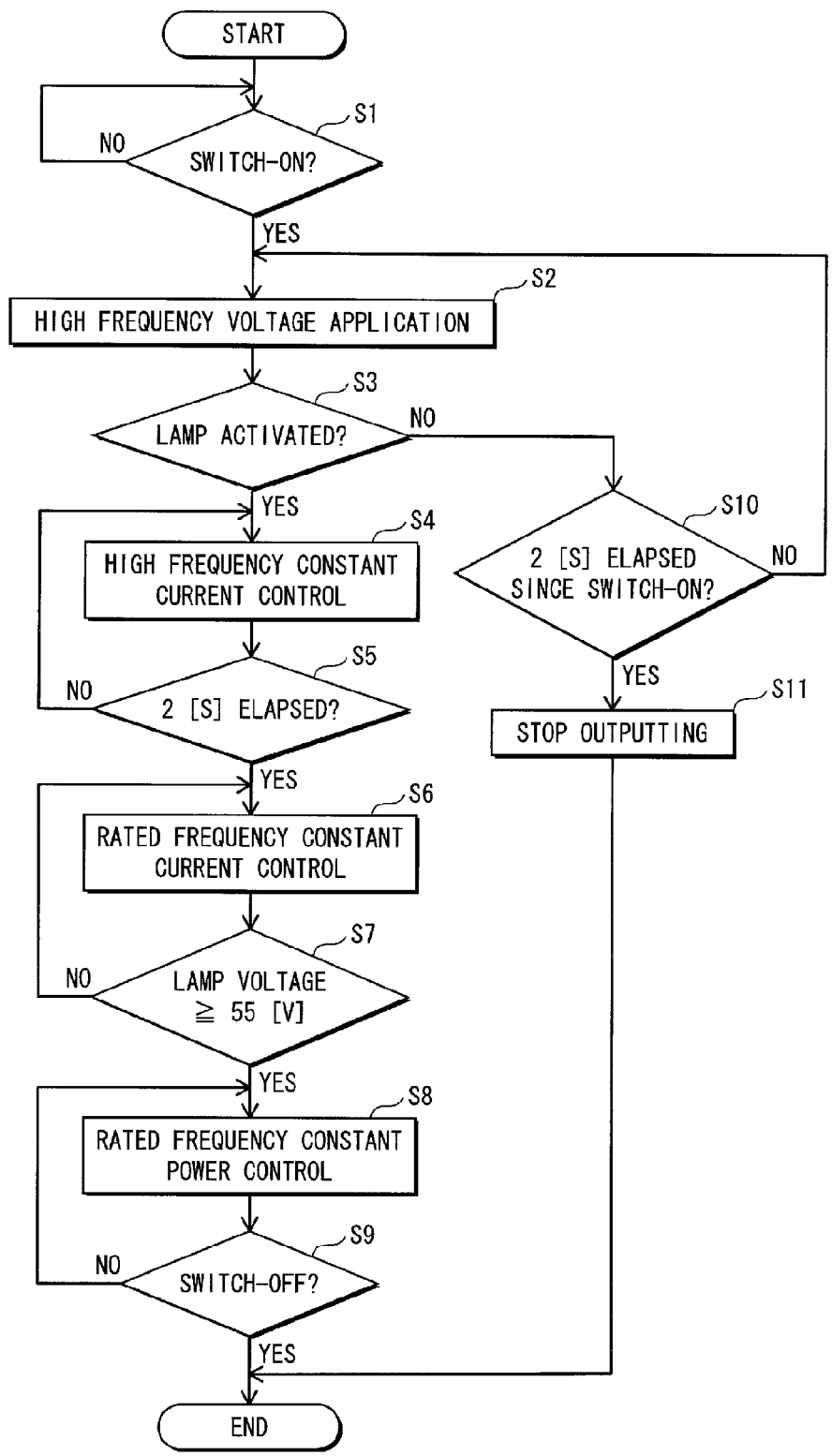

[Fig. 8]
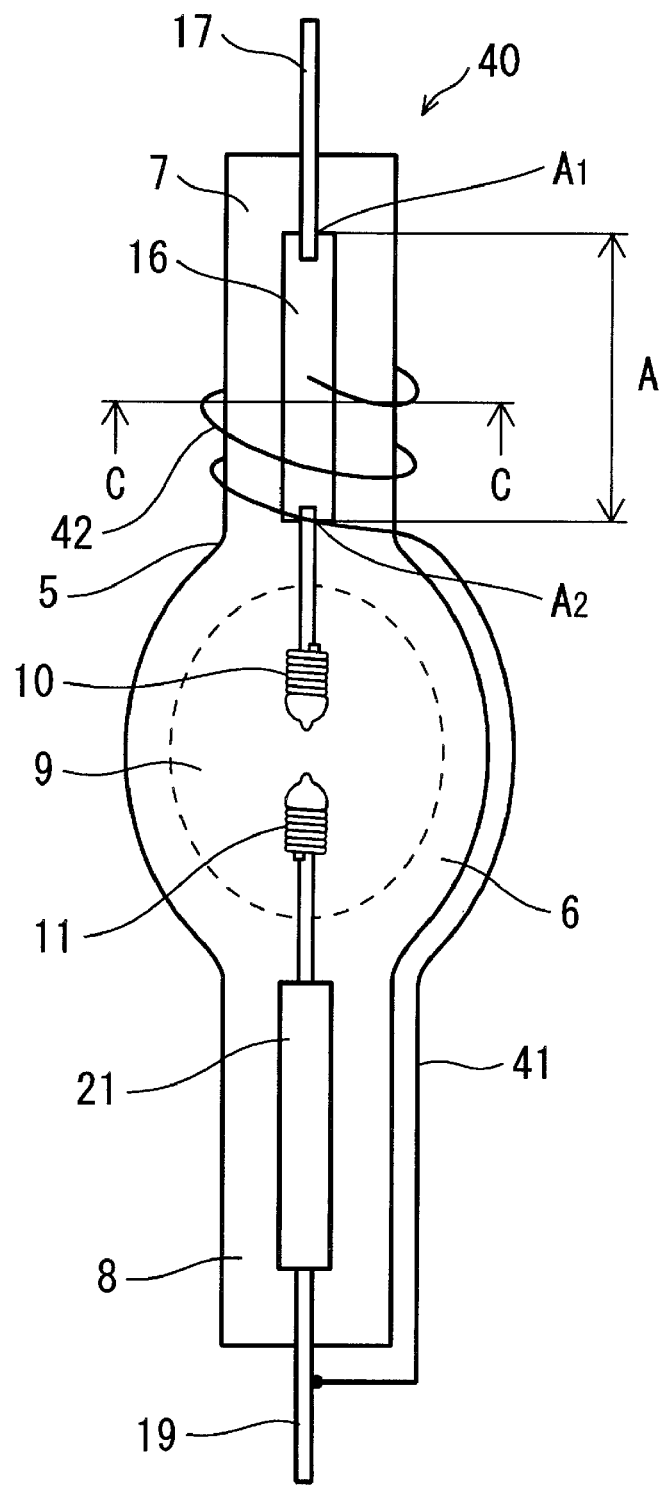

[Fig. 9]
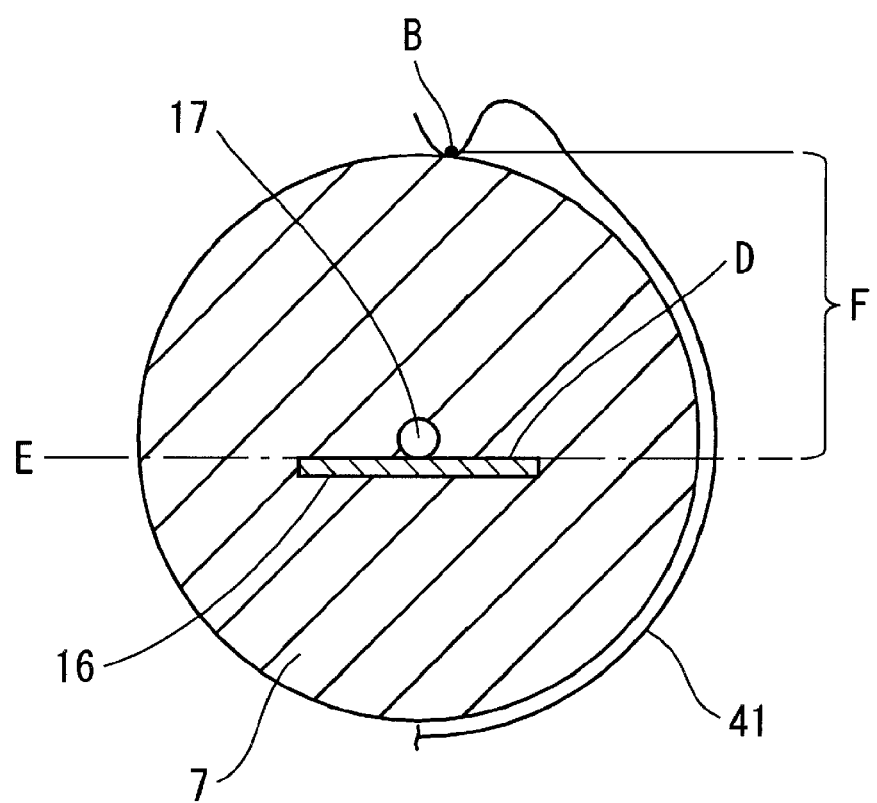

[Fig. 10]
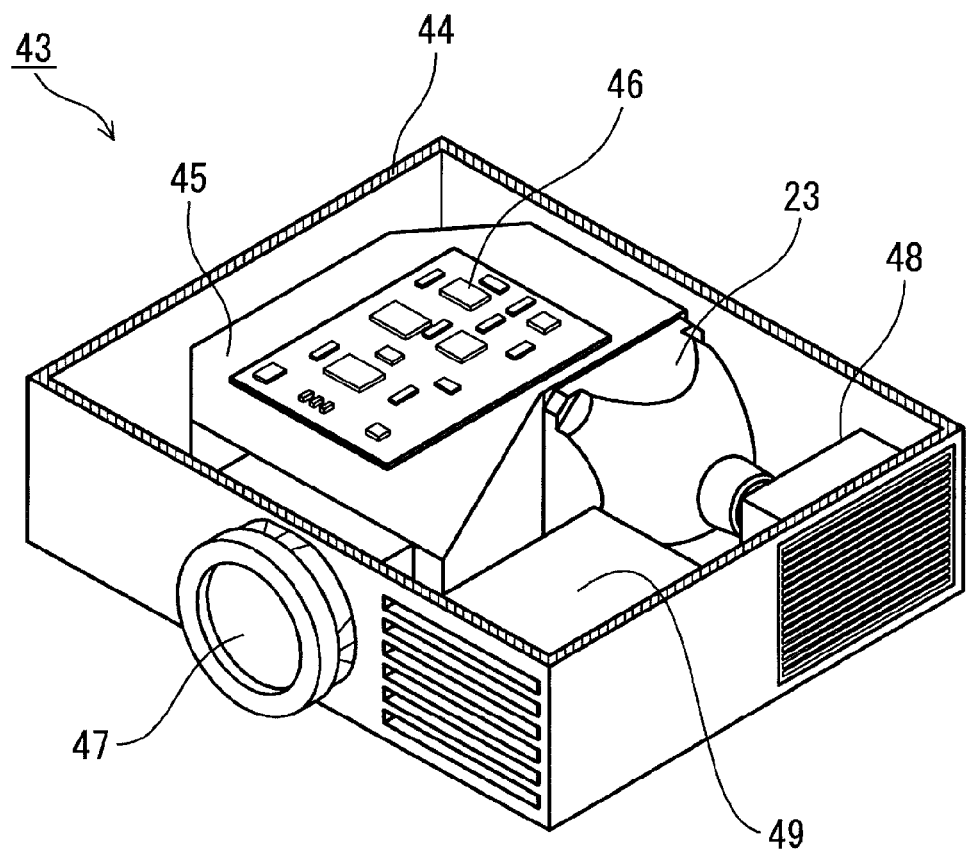

[Fig. 11]
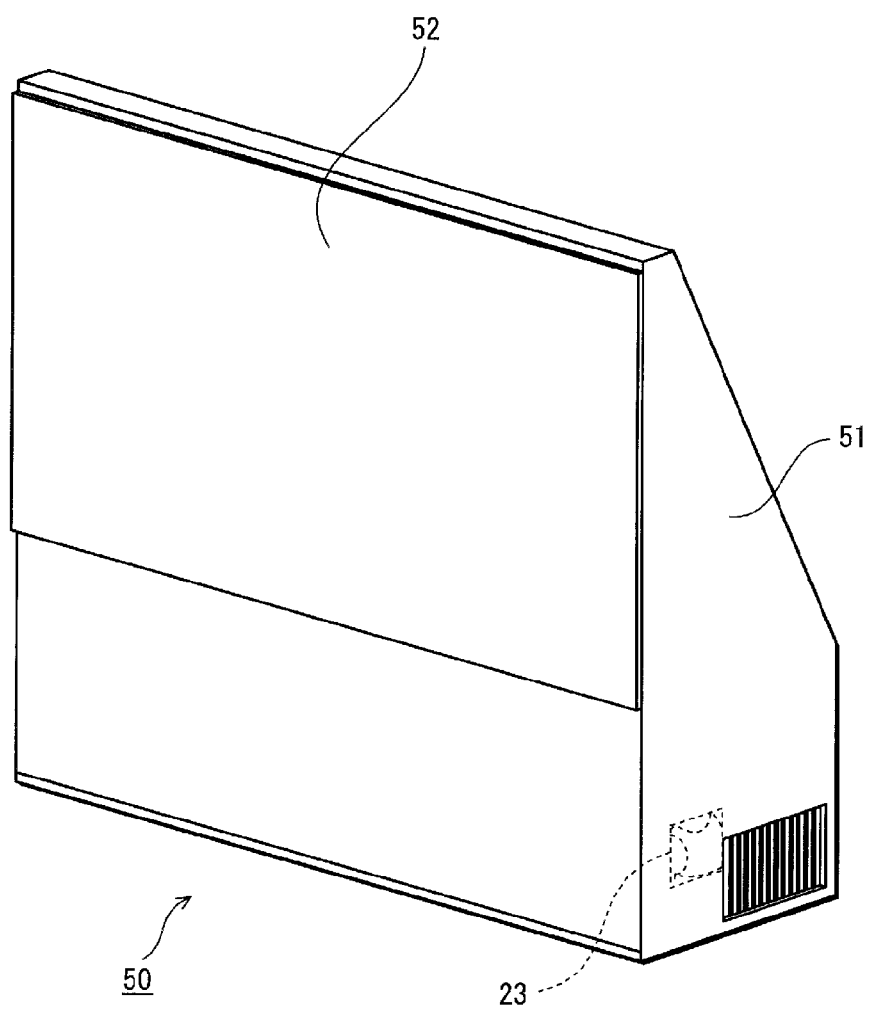

HIGH-PRESSURE DISCHARGE LAMP SYSTEM AND PROJECTOR USING THE SAME

TECHNICAL FIELD

The present invention relates to a high-pressure discharge lamp system and a projector using the same.

BACKGROUND ART

Recently, a projector is used in a presentation at a conference and etc. or in a home theater in a common household.

Such a projector has a light source and a device (e.g. transmissive liquid crystal display device, digital micro mirror device, and etc.) operated according to image information. The projector projects outgoing beam from the light source onto the device, and expands optical images to be displayed. An example of such a light source is a high-pressure mercury lamp that is closer to a point light source and has high luminance and high color rendering property. The high-pressure mercury lamp has, for example, 200 [mg/cm$^3$] of mercury enclosed therein as a light emitting material, and an arc tube in which a pair of electrodes made of tungsten is disposed.

In general, to activate this high-pressure mercury lamp, a high voltage pulse at 20 [kv] or higher needs to be applied between the pair of electrodes. However, in order to generate such a high voltage pulse, a large scale transformer, a high voltage resistant electronics component or the like needs to be used in the lighting circuit. The use of these components is detrimental for cost-cutting or downsizing of the entirety of the high-pressure discharge lamp system having the lighting circuit.

In response to the above, in order to lower the starting voltage, conventionally, it is applied practically that a conductor made of a metal wire called a proximity conductor or a trigger wire is attached to the arc tube. A variety of innovative ideas of attachment of the conductor are suggested for lowering the starting voltage.

For example, the following is suggested. By disposing a top end of the trigger wire externally of the arc tube, when the lamp is activated, remarkable inequality in the electronic field is formed between the top end and the electrode inside the arc tube, thereby promoting dielectric breakdown between the pair of electrodes, such that the high-pressure pulse of the starting voltage can be decreased to 4-8 [kV] (e.g. Patent Citation 1).

In addition, the following is suggested. The location of a portion of the proximity conductor is limited in a designated area of the sealing part of the arc tube, and the proximity conductor is wound such that a closed loop is not formed. The high-pressure pulse of the starting voltage can be decreased to 8 [kV] or less (e.g. Patent Citation 2).

However, when the high-pressure discharge lamp system is designed as mentioned above in order to satisfy the demands for downsizing the entirety of the lamp and cost-cutting, the upper limit of the high-pressure pulse that can be generated by the lighting circuit is approximately 4.0 [kV]. Then, when a margin is taken into consideration for practical use, the starting voltage of the high-pressure mercury lamp is demanded to be 3.0 [kV]-3.5 [kV], inclusive. It is considered that merely adopting the trigger wire (proximity conductor) and devising the attachment thereof, described as above, cannot fully satisfy these demands. Hence, in order to meet such demands, in addition to the adoption of the trigger wire, a radioactive material, such as Krypton 85 ($^{85}$Kr), is enclosed within the arc tube.

Patent Citation 1: JP No. 2003-317663
Patent Citation 2: WO No. 2004-090934

DISCLOSURE OF INVENTION

Problems Solved by the Invention

However, a radioactive material, such as Krypton 85, is at a high cost, which does not fully satisfy the demand for cost-cutting of the entirety of the high-pressure discharge lamp system.

The present invention is conceived in view of the above problems. It is an object of the present invention to provide a high-pressure discharge lamp system that is at a low cost without using a radioactive material and can be activated with a low starting voltage, and a projector using the lamp system.

Means to Solve the Problem

One aspect of the present invention is a high-pressure discharge lamp system having a high-pressure discharge lamp and a lighting circuit that operates the high-pressure discharge lamp, the high-pressure discharge lamp that includes a glass envelope including a light emitting part having a discharge space formed therein and a first and a second sealing part oppositely extending from the light emitting part, a first electrode having one end located within the discharge space and another end connected to a first metal foil sealed within the first sealing part, a second electrode having one end located within the discharge space and another end connected to a second metal foil sealed within the second sealing part, and a conductor electrically connected to the second electrode and disposed externally of the envelope, wherein a portion of the conductor is in contact with or in closest proximity to an outer surface of the first sealing part substantially at a single point, the single point being located in an area of the outer surface that corresponds to the first metal foil and that excludes areas of the outer surface sandwiched between two virtual planes each containing one main surface of the first metal foil, and the lighting circuit activates the high-pressure discharge lamp by placing a high-frequency voltage at a predetermined frequency between the first and the second electrodes, the predetermined frequency falling within a range from 10 [kHz] to 10 [MHz], inclusive.

According to the above features, when a high-frequency voltage at a predetermined frequency in the range from 10 [kHz] to 10 [MHz], inclusive, is applied between the first and the second electrodes, the following effects can be obtained. (1) First, glass of the first sealing part between the portion of the conductor electrically connected to the second electrode and the first metal foil becomes dielectrically polarized. Furthermore, since the first metal foil is adhered to the glass, which is to say, since there is no space causing the decrease in the dielectric polarization between the conductor and the first metal foil, the glass can be strongly polarized. (2) Secondly, since the portion of the conductor is in contact with or in the closest proximity to the outer surface of the first sealing part substantially at a single point in the designated area, extremely remarkable inequality occurs thereby creating density in the electric field between the portion of the conductor and the outer surface (glass surface) of the first sealing part, which consequently accelerates the electron emission from the conductor. (3) Thirdly, since the high-frequency voltage is applied to the conductor, the electron emission can be maintained. As a result, even though the voltage applied between the conductor and the first metal foil is extremely low, for example, 1.5 [kV]-2.0 [kV], inclusive, as a synergetic effect, electrons are emitted from the conductor. Due to the electron emission, mainly nitrogen in the air between the conductor and the outer surface (glass surface) of the first sealing part is ionized, thereby causing creeping discharge or corona discharge. When the nitrogen is being ionized, ultraviolet rays with wavelength of 100 [nm]-400 [nm], inclusive, are radiated. The ultraviolet rays pass through the glass of the first sealing part and radiate a metal material, such as a generally-enclosed light-emitting material and the electrodes, within the discharge space. Due to photoelectric effect, photoelectrons inside the discharge space can be increased. Accordingly, these photoelectrons promote dielectric breakdown between the first and the second electrodes. Without the use of conventional radioactive material, the lamp can be activated with an extremely low starting voltage (e.g. 3.0 [kV] or less).

Herein, the portion of the conductor being in contact with the outer surface of the first sealing part literally means that the conductor is "in contact" with the outer surface of the first sealing part with the shortest distance therebetween being 0 [mm]. In contrast, when the portion of the conductor is "in the closest proximity" to the outer surface of the first sealing part, the portion of the conductor is not in contact with but in the very closest proximity to the outer surface of the first sealing part, more specifically, with the shortest distance therebetween being 0.3 [mm] or less. Experiments confirm that if the portion of the conductor is "in the closest proximity" to the first sealing part in the above range, basically identical effects can be obtained with the case where the portion of the conductor is "in contact" with the first sealing part.

Herein, "the main surface" of the metal foil means a surface having the largest surface area.

Furthermore, a portion of the conductor is in contact with or in the closest proximity to the outer surface of the first sealing part substantially at a single point being located "in an area of the outer surface that corresponds to the first metal foil and that excludes areas of the outer surface sandwiched between two virtual planes each containing one main surface of the first metal foil." This means that the conductor is in contact with or in the closest proximity to the outer surface of the first sealing part at a single point only in the above designated area. In an area other than the designated area, the portion of the conductor may be or may not be in contact with or in the closest proximity to the outer surface of the first sealing part in any configuration, such as at a point, in a line, or on a surface.

In the above configuration, it is desirable that the conductor is made of a metal wire, and the portion of the conductor is one end of the metal wire. In addition, it is desirable that the conductor is made of a metal wire having a bent portion substantially in a U shape or in a V shape, and that the portion of the conductor is a bending point of the bent portion.

Furthermore, when the portion of the conductor is in contact with the outer surface of the first sealing part, the conductor has a wound part being wound around the first sealing part and being out of contact with the outer surface, the wound part has an inner diameter smaller than an outer diameter of the first sealing part, and is fitted over the first sealing part with the inner diameter of the wound part being expanded, and it is desirable that the portion is pressed against the outer surface of the first sealing part by the resilience caused by shrinking force of the inner diameter of the wound part.

Furthermore, it is desirable that the frequency is 200 [kHz] or higher.

Another aspect of the present invention is a projector having the above-mentioned high-pressure discharge lamp system.

With the above features, a low-cost projector can be realized.

EFFECTS OF THE INVENTION

The present invention can realize a high-pressure discharge lamp system that is at a low cost without using a radioactive material and can be activated with a low starting voltage, and a projector using the high-pressure discharge lamp system.

BRIEF DESCRIPTION OF THE DRAWINGS

FIG. 1 is a block diagram showing a structure of a high-pressure discharge lamp system in accordance with Embodiment 1 of the present invention;

FIG. 2 is a front view of an arc tube of a high-pressure mercury lamp included in the high-pressure discharge lamp system;

FIG. 3 is a front view showing an outline structure of electrodes of the high-pressure mercury lamp included in the high-pressure discharge lamp system;

FIG. 4 is a cross-section view along a line C-C of FIG. 2 (when a portion of a conductor is in contact with a first sealing part);

FIG. 5 is a cross-section view along the line C-C of FIG. 2 (when the portion of the conductor is in the closest proximity to the first sealing part);

FIG. 6 is a partially cutout perspective view showing a lamp unit included in the high-pressure discharge lamp system;

FIG. 7 is a flowchart showing operation of a lighting circuit included in the high-pressure discharge lamp system;

FIG. 8 is a front view of an arc tube of a high-pressure mercury lamp included in a high-pressure discharge lamp system in accordance with Embodiment 2 of the present invention;

FIG. 9 is a cross-section view along a line C-C of FIG. 8;

FIG. 10 is a partially cutout perspective view showing a structure of a front projector as a projection type image display device in accordance with Embodiment 3 of the present invention; and FIG. 11 is a perspective view showing a structure of a rear projector as the projection type image display device.

Figure 12A:
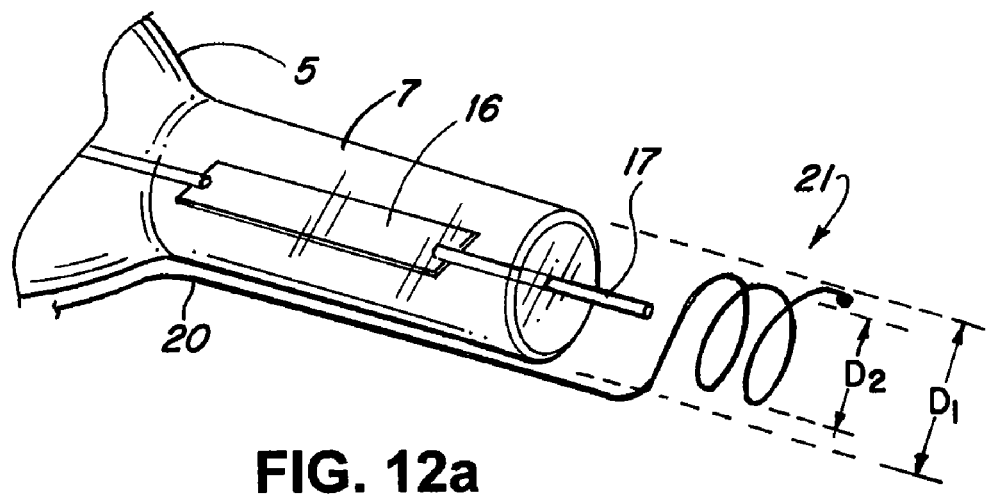
FIG. 12$a$ and FIG. 12$b$ are perspective views showing the conductor initially wound into a smaller diameter D2 than the diameter D1 of the sealing part in FIG. 12$a$, FIG. 12$b$ shows the wound part expanded as installed on one end of the first sealing part.

DESCRIPTION OF THE CHARACTERS 1 high-pressure discharge lamp system
2 power supply unit
3 lighting circuit
4, 40 high-pressure mercury lamp
5 arc tube
6 light emitting part
7 first sealing part
8 second sealing part
9 discharge space
10 first electrode
11 second electrode
10$a$, 11$a$ top end of electrode
10$b$, 11$b$ protruding part 12, 13 electrode bar
14, 15 electrode coil
16 first metal foil
17 first exterior lead wire
18 second metal foil
19 second exterior lead wire
20, 41 conductor
21, 42 wound part
22 reflecting mirror
23 lamp unit
24 reflecting surface
25 power supply connecting terminal
26 base
27 power supplier
28 neck part
29 adhesive
30 through hole
31 DC/DC converter
32 DC/AC inverter
33 high voltage supply unit
34 lamp current detection unit
35 lamp voltage detection unit
36 control unit
37 switching device
38 coil
39 condenser
43 front projector
44, 51 housing
45 optical unit
46 control unit
47 projection lens
48 cooling fan unit
49 power supply unit
50 rear projector
52 transmissive screen

BEST MODE FOR CARRYING OUT THE INVENTION

The following describes embodiments of the present invention with reference to the drawings.

Embodiment 1

FIG. 1 is a block diagram showing a structure of a high-pressure discharge lamp system 1 in accordance with Embodiment 1 of the present invention.

As shown in FIG. 1, the high-pressure discharge lamp system 1 includes a power supply unit 2, a lighting circuit 3 (electronic ballast) and a high-pressure mercury lamp 4. The power supply unit 2 connected to an external AC source (AC100[V]) is connected to a high-pressure discharge lamp, such as the high-pressure mercury lamp 4, via the lighting circuit 3.

(High-Pressure Mercury Lamp 4)

Firstly, the following describes a structure of the high-pressure mercury lamp 4. As an example thereof, FIG. 2 shows an arc tube 5 of the high-pressure mercury lamp 4 whose rated electricity is 165 [W].

As shown in FIG. 2, an envelope of the arc tube 5 is made of, for example, quartz glass. The arc tube 5 has a light emitting part 6, a first sealing part 7 and a second sealing part 8. The light emitting part 6 is in a shape of substantially a spheroid of revolution and located at the center of the arc tube 5. The first sealing part 7 and the second sealing part 8 are each substantially in a cylindrical shape and oppositely extend from the light emitting part 6.

Enclosed inside the light emitting part 6 (discharge space 9), are mercury (Hg) that is a light emitting material, a rare gas that aids activation, such as Argon gas (Ar), Krypton gas (Kr), a Xenon gas (Xe), or a mixture of two or more of the aforementioned gases, iodide (I) or bromine (Br) for halogen cycle each at a given amount. For example, am amount of mercury enclosed therein is within a range between 150 [mg/cm$^3$] and 650 [mg/cm$^3$], inclusive. An amount of argon gas (25 degrees Celsius) enclosed therein is within a range between 0.01 [MPa]-1 [MPa], inclusive. An amount of bromine enclosed therein is within a range between $1 * 10^{-10}$ [mol/cm$^3$]-$1 * 10^{-4}$ [mol/cm$^3$], inclusive, favorably $1 * 10^{-9}$ [mol/cm$^3$] and $1 * 10^{-5}$ [mol/cm$^3$], inclusive.

In addition, disposed inside the light emitting part 6 are a first electrode 10 and a second electrode 11, taken as a pair and made of tungsten, with ends thereof substantially opposing each other. In other words, a central axis in a longitudinal direction of the first electrode 10 (substantially coincident with a central axis in a longitudinal direction of the arc tube 5) and a central axis in a longitudinal direction of the second electrode 11 are substantially coincident with each other. For example, a distance L (see FIG. 2) between these electrodes 10 and 11 is set within a range between 0.5 [mm] and 2.0 [mm], inclusive.

As shown in FIG. 3, the first electrode 10 and the second electrode 11 are respectively composed of electrode bars 12 and 13 and electrode coils 14 and 15 each attached to one end thereof. Particularly, top ends 10a and 11a (one end) of the respective electrodes 10 and 11 are each processed in a shape, such as a substantially hemispherical shape, a substantially spherical shape or a substantially conical shape, with a part of each of the electrode bars 12 and 13 integrally fused to a part of each of the electrode coils 14 and 15, respectively. Due to the halogen cycle during the lamp operation, protruding parts 10b and 11b are formed on the top ends 10a and 11a of the electrodes 10 and 11, respectively. That is to say, after tungsten that is a constituent material of the electrodes 10 and 11 is evaporated during the lamp operation, tungsten returns and becomes deposited again on the electrodes 10 and 11, particularly on the top parts of the top ends 10a and 11a. As a result, protruding parts 10b and 11b made of the deposition is spontaneously formed. The protruding parts 10b and 11b shown herein are generated during aging in the manufacturing process. By the time the manufacturing process is completed, the protruding parts 10b and 11b have been already formed. The distance L between the electrodes 10 and 11 is, specifically, between these protruding parts 10b and 11b.

Note that in order to form the top ends 10a and 11a of the respective first and second electrode 10 and 11 each in a substantially hemispherical shape, a substantially spherical shape or a substantially conical shape, instead of fusing the parts of the electrode bars 12 and 13 with the parts of the electrode coils 14 and 15, respectively, objects that have been preliminary carved out in a substantially hemispherical shape, a substantially spherical shape or a substantially conical shape, may be attached to top endsof the electrode bars 12 and 13, respectively. Alternatively, objects that are sintered in such a shape may be attached to the top ends 10a and 11a.

Returning to FIG. 2, another end of the first electrode 10 is connected to one end of a first exterior lead wire 17 via a molybdenum first metal foil 16 sealed airtight within the first sealing part 7. Another end of the first exterior lead wire 17 protrudes from an edge of the first sealing part 7, and is connected to an unshown power supplier or base. In addition, similarly, another end of the second electrode 11 is connected to one end of a second external lead wire 19 via the molybdenum second metal foil 18 sealed airtight within the second sealing part 8. Another end of the second exterior lead wire 19 protrudes from an edge of the second sealing part 8, and is connected to an unshown power supplier or base. Note that a thickness of each of the first and second metal foils 16 and 18 is usually set within a range between 10 [micro meters] and 30 [micro meters], inclusive. In this embodiment, the thickness of each of the first and second metal foils 16 and 18 is 20 [micro meters].

In addition, attached to the arc tube 5 is a conductor 20 that serves to aid activation of the high-pressure mercury lamp 4. The conductor 20 is made of alloy of iron and chromium and a wire diameter thereof is, for example, 0.3 [mm], falling within a range of 0.1 [mm]-2.0 [mm], inclusive. The conductor 20 is joined to the second lead wire 19 thereby being electrically connected to the second electrode 11, and a portion of the conductor 20 is in contact with or in the closest proximity to an area of an outer surface of the first sealing part 7 that corresponds to the first metal foil 16. More specifically, the portion of the conductor 20 is located in the area (area A in FIG. 2) of the outer surface of the first sealing part 7 corresponding to the first metal foil 16, and the conductor 20 extends toward the second external lead wire 19, straddling the light emitting part 6 and the second sealing part 8. Another end of the conductor 20 is electrically connected to the second external lead wire 19, thereby being electrically connected to the second electrode 11.

Note that the "area A" is an area of the first sealing part 7 sandwiched between a surface $A_1$ (see FIG. 2) and a surface $A_2$ (see FIG. 2). The surface $A_1$ includes one end of the first metal foil 16 in a longitudinal direction thereof and is perpendicular with respect to the central axis in the longitudinal direction of the first sealing part 7 (coincident with the central axis X in the longitudinal direction of the arc tube 5). The surface $A_2$ includes another end of the first metal foil 16 in a longitudinal direction thereof and is perpendicular with respect to the central axis in the longitudinal direction of the first sealing part 7.

As shown in FIGS. 2 and 4, the portion (shown as B in FIG. 2) of one end of the conductor 20 is in contact with the outer surface of the first sealing part 7 substantially at a single point in the area (area A) of the first sealing part 7 corresponding to the first metal foil 16 and an area (shown as F in FIG. 4) of the first sealing part 7 containing one main surface D of a virtual plane E (see FIG. 4) when the first sealing part 7 is cut along the virtual plane E. In other words, the portion B of the conductor 20 is, substantially at a single point, in contact with a curved surface (outer surface of the first sealing part 7) of substantially half of the first sealing part 7 obtained by being cut out only in the area A cut along the plane E containing the main surface D. Note that the main surface has the largest surface area of the first metal foil 16. The main surface is a surface that can be seen in the front view of FIG. 2 or a rear surface thereof. That is to say, the portion (shown as B in FIG. 2) of one end of the conductor 20 is in contact with the outer surface of the first sealing part 7 substantially at a single point in the area (area A) of the outer surface corresponding to the first metal foil 16 and an area (shown as F in FIG. 4) of the outer surface excluding areas sandwiched between a virtual plane E (see FIG. 4) containing one main surface D (see FIG. 4) of the first metal foil 16 and another virtual surface containing another main surface.

As described above, the thickness of each of the first and second metal foils 16 and 18 is 20 [micro meters] which is extremely thin. Note that, for convenience in description, in FIG. 4 and hereinafter shown FIGS. 5 and 9, the thickness is drawn with exaggeration.

The portion B of the conductor 20 is not limited to be "in contact" with the outer surface of the first sealing part 7 substantially at a single point in the designated area. As shown in FIG. 5, the portion B of the conductor 20 may be "in the closest proximity" to the outer surface of the first sealing part 7 substantially at a single point in the designated area. In other words, a shortest distance d (see FIG. 5) between the portion B of the conductor 20 and the outer surface of the first sealing part 7 may be 0.3 mm or less, because it is confirmed by experiments that being "in the closest proximity" in the above range can achieve the operation effect as described later.

The characteristic of the above is that one end part of the conductor 20 is wound around the first sealing part 7 substantially 2.5 turns. Note that the portion of the conductor 20 is in contact with or in the closest proximity to the outer surface of the first sealing part 7 at a single point only in the area A and the area F (hereinafter, referred to as "contact restriction area"), and a remaining portion of the conductor 20 is neither in contact with nor in the closest proximity to the outer surface in the contact restriction area. As a matter of course, in areas excluding the contact restriction area, the conductor 20 may be or may not be in contact with or in the closest proximity to the outer surface of the first sealing part 7 in any configuration, such as at a point, in a line, or on a surface. In addition, except for the outer surface of the first sealing part 7, the conductor 20 may be or may not be in contact with or in the closest proximity to an outer surface of the light emitting part 6 or of the second sealing part 8 in any configuration, such as at a point, in a line, or on a surface. As a matter of course, in the areas excluding the contact restriction area, the conductor 20 may be attached being wound around the arc tube 5, or simply along the arc tube 5 linearly. In other words, in the areas excluding the contact restriction area, the conductor 20 may be attached to the arc tube 5 in any configuration.

Figure 12B:
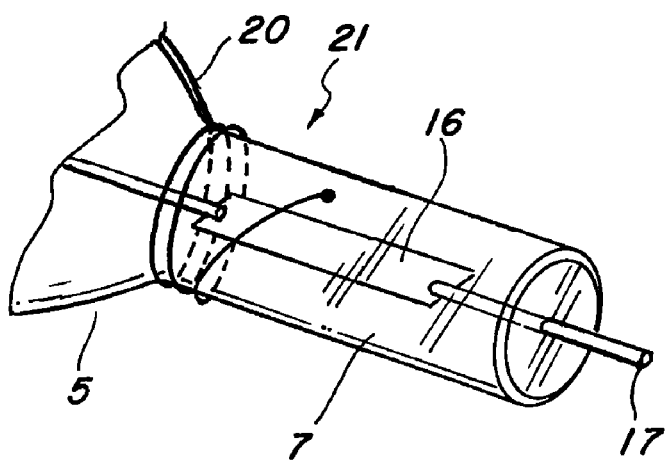

As shown in the example of FIG. 2, the conductor 20 has a wound part 21 being wound around the first sealing part 7 substantially 2.5 turns. In addition, it is desirable that the wound part 21 has been wound in a loop with an inner diameter thereof being smaller than an outer diameter of the first sealing part 7. It is desirable that when the wound part 21 is fitted over the first sealing part 7, the inner diameter of the wound part 21 is expanded. Thus, the portion of the conductor 20 being in contact with the outer surface of the first sealing part 7 is pressed against the outer surface of the first sealing part 7 by resilience in a shrinking direction of the inner diameter of wound part 21. As a result, dislocation of the conductor 20 with regard to the first sealing part 7 can be prevented. As can be seen in FIGS. 12a and 12b, the wound part 21 can be initially wound into an inner diameter D2 smaller than the outer diameter D1 of the sealing part 7. Accordingly, the diameter D2 can be expanded to press against an outer surface of the first sealing part as shown in FIG. 12B.

In the above example, the description is made when the conductor 20 is made of alloy of iron and chromium. Note that, however, in addition to iron and chromium, the conductor 20 may be made of a metal wire made of molybdenum and the like. In addition, a whole of the conductor 20 does not need to be formed from a metal wire. It is sufficient that at least the portion of the conductor 20 being in contact with or in the closest proximity to the first sealing part 7 substantially at a single point is in a linear shape. The remaining portion may be in a belt-like shape, for example.

(Lamp Unit 23)

As shown in FIG. 6, the high-pressure mercury lamp 4, as mentioned above, set in a reflecting mirror 22 constitutes a lamp unit 23, and is used as a light source in the high-pressure discharge lamp system 1.

As shown in FIG. 6, the lamp unit 23 includes the above high-pressure mercury lamp 4 and the reflecting mirror 22 whose base substance is glass. The reflecting mirror 22 has a reflecting surface 24 whose inside surface is concave. Inside the reflecting mirror 22, the high-pressure mercury lamp 4 is installed in such a manner that the central axis X in a longitudinal direction of the arc tube 5 is substantially coincident with an optical axis Y of the reflecting mirror 22. The lamp unit 23 is structured in such a manner that light projected from the high-pressure mercury lamp 4 is reflected from the reflecting surface 24.

In the high-pressure mercury lamp 4, a cylindrical base 26 having a power supply connecting terminal 25 provided therein is attached to the first sealing part 7 of the arc tube 5. A first external lead wire (unshown) extending outwardly from the first sealing part 7 is connected to the power supply connecting terminal 25. A power supplier 27 is connected to the second exterior lead wire 19.

In this high-pressure mercury lamp 4, the base 26 is inserted in a neck part 28 of the reflecting mirror 22, and is secured therein by an adhesive 29. Then, the power supplier 27 is inserted in a through hole 30 provided in the reflecting mirror 22.

Note that the reflecting surface 24 is a spheroidal surface or paraboloid surface, and multilayer interference film or the like is deposited on the reflecting surface 24.

(Lighting Circuit 3)

The lighting circuit 3 activates and maintains lighting of the high-pressure mercury lamp 4. As shown in FIG. 1, the lighting circuit 3 is mainly composed of a DC/DC converter 31, a DC/AC inverter 32, a high voltage supply unit 33, a lamp current detection unit 34, a lamp voltage detection unit 35 and a control unit 36.

The DC/DC converter 31 supplies a given magnitude of direct current to the DC/AC inverter 32 in response to a PWM (Pulse Width Modulation) control signal from the control unit 36. That is to say, during stable operation (steady operation) of the lamp 4, control needs to be performed to keep the lamp power constant such that the light outputted from the high-pressure mercury lamp 4 is kept constant. For that purpose, the control unit 36 calculates the lamp power based on lamp current detected by the lamp current detection unit 34 and lamp voltage detected by the lamp voltage detection unit 35, and transmits, to the DC/DC converter 31, the PWS control signal that keeps the lamp power constant. In response, the DC/DC converter 31 converts the direct current from the power supply unit 2 to a given magnitude of the direct current. Note that from the activation until when the given lamp power is obtained (until the lamp voltage reaches a given value), the control unit 36 transmits the PWM control signal to the DC/DC converter 31 to control the lamp current to be maintained constant.

The DC/AC inverter 32 has, for example, two pairs of switching devices (FET) 37.

By turning ON and OFF of each pair alternatively, the DC/AC inverter 32 generates a predetermined frequency of rectangular current from the direct current fed from the DC/DC converter 31, based on the control signal transmitted from the control unit 36.

For example, with the use of resonance circuit having a coil 38 and a condenser 39, the high voltage supply unit 33 generates a predetermined frequency of high-frequency voltage and applies the high-frequency voltage between the first and the second electrodes 10 and 11. The predetermined frequency falls within the range between 10 [kHz] and 10 [MHz], inclusive. Thus, the high voltage supply unit 33 promotes dielectric breakdown between the first and the second electrodes 10 and 11 thereby activating the high-pressure mercury lamp 4.

Subsequently, operation of the lighting circuit 3 is described with the use of the flowchart of FIG. 7.

When a switch (unshown) of the power supply unit 2 is turned ON (Step S1: YES), the control unit 36 controls the DC/DC converter 31 and the DC/AC inverter 32 to generate high-frequency voltage at a predetermined frequency within the range between 10 [kHz] and 10 [MHz], inclusive, for example, 300 [kHz], and applies the high-frequency voltage between the first and the second electrodes 10 and 11 of the high-pressure mercury lamp 4 (Step S2).

Subsequently, determination is made whether the high-pressure mercury lamp 4 has been activated (Step S3). When the dielectric breakdown occurs between the first and the second electrodes 10 and 11, a current of arc discharge flows therebetween. The lamp current detection unit 34 detects the flow of the arc discharge current, thereby determining whether the high-pressure mercury lamp 4 has been activated.

If the high-pressure mercury lamp 4 has not been activated (S3: NO), the operation goes to Step S10 and determination is made whether 2 [s], for example, has elapsed since the switch-ON. If not, the operation goes to Step S2, and subsequently in Step 3, when it can be determined that the high-pressure mercury lamp 4 has been activated, the application of the high-frequency voltage is stopped, and the high-frequency constant current control is performed (S4). This high-frequency constant current control is performed so that the first and the second electrodes 10 and 11 can be warmed up harmlessly. After the application for a given period of time, for example, 2 seconds (S5: YES), the rated-frequency constant current control is performed (S6). This rated-frequency constant current control is performed to promote evaporation of mercury inside the light emitting part 6 (discharge space 9). According to this rated-frequency constant current control, the control unit 36 controls the DC/DC converter 31, based on a detection signal of the current detection unit 34, thereby keeping a value of the lamp current constant (3 [A]).

Subsequently, the determination is made whether the lamp voltage is 55 [V] or more, for example (S7). When the lamp voltage is less than 55 [V] (Step S7: NO), the rated-frequency constant current control of Step 6 is maintained.

When the lamp voltage is 55 [V] or more (Step S7: YES), the rated-frequency constant power control of Step 8 is performed. According to this rated-frequency constant power control, the control unit 36 controls the DC/DC converter 31, based on each detection signal of the lamp current detection unit 34 and the lamp voltage detection unit 35, thereby appropriately controlling a value of current outputted from the DC/DC converter 31 so that a value of the lamp power is kept constant (165 [W]). During the operation of the lamp (Step S9: NO), Steps S7-S9 are regularly repeated. When the switch is turned OFF (Step S9: YES), the processing is completed.

Note that, when it is determined that 2 [s] has elapsed since the switch-ON in Step 10, it is determined that the high-pressure mercury lamp 4 has some abnormality, and the operation goes to Step S11 in which the output from the lighting circuit 3 is stopped and in which the lighting control is completed. Note that although the time elapsed since the switch-on is set as 2 [s], the present invention is not limited to this, and the elapsed time can be appropriately set.

In addition, a criterion for judging the lamp voltage in Step S7 is 55 [V]. This is because the current value of the rated-frequency constant current control in Step S6 is set as 3 [A]. This criterion changes according to how the current value of the rated-frequency constant current control is set or a rated electricity of the high-pressure mercury lamp 4.

However, when the above-mentioned rated-frequency constant current control and rated-frequency constant power control are performed, a frequency of an alternating current (lamp current) fed to the high-pressure mercury lamp 4 is a fixed value, such as 170 [Hz]. Needless to say, depending on change in lamp voltage, control may be performed to switch the value of the rated frequency of the alternating current. Also, not depending on the change in lamp voltage modulation control may be performed to regularly switch between different frequencies.

According to the high-pressure discharge lamp system 1 of Embodiment 1 having the above features, when a high-frequency voltage at a predetermined frequency in the range from 10 [kHz] to 10 [MHz], inclusive, is applied between the first and the second electrodes 10 and 11, the following effects can be obtained. (1) First, glass of the first sealing part 7 present between the portion of the conductor 20 electrically connected to the second electrode 11 and the first metal foil 16 becomes dielectrically polarized. Furthermore, since the first metal foil 16 is adhered to the glass, which is to say, since there is no space causing the decrease in the dielectric polarization between the conductor 20 and the first metal foil 16, the glass can be strongly polarized. (2) Secondly, since the portion of the conductor 20 is in contact with or in the closest proximity to the outer surface of the first sealing part 7 substantially at a single point in the contact restriction area, extremely remarkable inequality occurs thereby creating density in the electric field between the portion of the conductor 20 and the outer surface (glass surface) of the first sealing part 7, which consequently accelerates the electron emission from the conductor 20. (3) Thirdly, since the high-frequency voltage is applied to the conductor 20, the electron emission can be maintained. As a result, even though the voltage applied between the portion of the conductor 20 and the first metal foil 16 is extremely low, for example, 1.5 [kV]-2.0 [kV], inclusive, as a synergetic effect, electrons are emitted from the portion of the conductor 20. Due to the electron emission, mainly nitrogen in the air between the portion of the conductor 20 and the outer surface (glass surface) of the first sealing part 7 is ionized, thereby causing creeping discharge or corona discharge. When the nitrogen is being ionized, ultraviolet rays with wavelength of 100 [nm]-400[nm], inclusive, are emitted. The ultraviolet rays pass through the glass of the first sealing part 7 and radiate a metal material, such as mercury that is a light- emitting material generally enclosed therein and the first and second electrodes 10 and 11, within the discharge space 9. Due to photoelectric effect, photoelectrons inside the discharge space 9 can be increased. Accordingly, these photoelectrons promote dielectric breakdown between the first and the second electrodes 10 and 11. Accordingly, means for providing a corona discharge in ambient air adjacent the first sealing part is provided. Without the use of conventional radioactive material, the lamp can be activated with an extremely low starting voltage (e.g. 3.0[kV] or less). Thus, the low-cost high-pressure discharge lamp system 1 activated with a low starting voltage can be realized.

Even if the conductor 20 is disposed in an area of the outer surface of the first sealing part 7 corresponding to other metal member, such as the electrode bar 12, than the first metal foil 16, although glass between the conductor 20 and the electrode bar 12 is still dielectrically polarized, note the polarization is weaker than the aforementioned polarization, because air foam is generated in the periphery of the electrode bar 12.

Particularly, the frequency of the high-frequency voltage is desirably 200 [kHz] or more. Thus, when the high-frequency voltage is applied, the electrons emission from the conductor 20 can further be accelerated.

Actually, ten prototypes of the high-pressure mercury lamp system 1 in accordance with Embodiment 1 of the present invention (hereinafter, referred to as "present contrivance") were prepared. According to a measurement result, the starting voltage of each of the prototypes was within a range between 2.2 [kV]-2.5 [kV], inclusive.

Note that the frequency of the high-frequency voltage was set to 300 [kHz]. In the present contrivance, a radioactive material, such as Krypton 85, was not enclosed, and the present contrivance was activated only with the high-frequency voltage. In contrast to a conventional lamp, a high-pressure pulse voltage, such as 8 [kV], was not applied.

For comparison, ten prototypes of high-pressure discharge lamp systems (hereinafter referred to as "comparative object") were prepared. Each prototype had a basically identical structure with the high-pressure discharge lamp system 1 of Embodiment 1 except for the following. A part of one end of the conductor 20 was wound around the area A of the first sealing part 7 substantially 2.5 turns, and a portion of the conductor 20 was attached being in contact with the outer surface of the first sealing part 7. According to a measurement result, the starting voltage of each of the prototypes was within a range between 4.0 [kV]-6.5 [kV], inclusive.

Note that the frequency of the high-frequency voltage was also set to 300 [kHz]. The comparative object did not have a radioactive material, such as Krypton 85, enclosed therein, and was activated only with the high-frequency voltage, and the high-pressure pulse voltage was not applied.

Embodiment 2

As shown in FIG. 8, a high-pressure discharge lamp system of Embodiment 2 has a basically identical structure with the high-pressure discharge lamp system 1 of Embodiment 1 except for the following. According to a high-pressure mercury lamp 40, a configuration of the conductor 41 attached to the arc tube 5 is different. Accordingly, mainly the conductor 41 and attaching method thereof is described in detail, and a description of other features is omitted.

As shown in FIG. 8, as a starting aid of the high-pressure mercury lamp 40, the conductor 41 with the following features is attached to the arc tube 5. The conductor 41 is made of an alloy of iron and chrome and has a wire diameter within a range of 0.1 [mm]-2.0 [mm], inclusive, for example, 0.3 [mm]. More specifically, one end portion of the conductor 41 is located in an area (shown as area A in FIG. 8) of the outer surface of the first sealing part 7 corresponding to the first metal foil 16, and extends toward the second external lead wire 19, straddling the light emitting part 6 and the second sealing part 8. Another end of the second external lead wire 19 is electrically connected to the second external lead wire 19, thereby being electrically connected to the second electrode 11. As with the aforementioned embodiment, the "area A" is an area of the first sealing part 7 sandwiched between a surface $A_1$ (see FIG. 8) and a surface $A_2$ (see FIG. 8). The surface $A_1$ includes one end of the first metal foil 16 in a longitudinal direction thereof and is perpendicular with respect to the central axis in the longitudinal direction of the first sealing part 7 (coincident with the central axis X in the longitudinal direction of the arc tube 5). The surface $A_2$ includes another end of the first metal foil 16 in a longitudinal direction thereof and is perpendicular with respect to the central axis in the longitudinal direction of the first sealing part 7.

As shown in FIG. 9, one end portion of the conductor 41 is bent in a U shape. The point bent in the U shape (shown as B in FIG. 9) is in contact with an outer surface of the first sealing part substantially at a single point in the area (area A) of the first sealing part 7 corresponding to the first metal foil 16 and an area (shown as F in FIG. 4) of the first sealing part 7 containing one main surface D of a virtual plane E (see FIG. 4) when the first sealing part 7 is cut along the virtual plane E. In other words, the point B of the conductor 41 is, substantially at a single point, in contact with a curved surface (outer surface of the first sealing part 7) of substantially half of the first sealing part 7 obtained by being cut out only in the area A, cut along the plane E containing the main surface D of the first metal foil 16. Note that the main surface has the largest surface area of the first metal foil 16. The main surface is a surface that can be seen in the front view of FIG. 8 and a rear surface thereof. That is to say, The point bent in the U shape (shown as B in FIG. 9) is in contact with an outer surface of the first sealing part substantially at a single point in the area (area A) of the outer surface corresponding to the first metal foil and an area (shown as F in FIG. 9) excluding areas of the outer surface sandwiched between a virtual plane E (see FIG. 9) containing one main surface D of the first metal foil 16 and another virtual surface containing another main surface.

The point B of the conductor 41 is not limited to be "in contact" with the outer surface of the first sealing part 7 substantially at a single point in the contact restriction area. As shown in FIG. 5, the point B of the conductor 41 may be "in the closest proximity" to the outer surface of the first sealing part 7 substantially at a single point in the designated area. In other words, the shortest distance d (identical with the shortest distance in FIG. 5) between the point B of the conductor 41 and the outer surface of the first sealing part 7 may be 0.3 mm or less.

A part of one end of the conductor 41 is wound around the first sealing part 7 substantially 2.5 turns. Note that the portion of the conductor 41 is in contact with or in the closest proximity to the outer surface of the first sealing part 7 at a single point only in the contact restriction area, and a remaining portion of the conductor 41 is neither in contact with nor in the closest proximity to the outer surface in the contact restriction area. As a matter of course, in the areas excluding the contact restriction area, the conductor 41 may be or may not be in contact with or in the closest proximity to the outer surface of the first sealing part 7 in any configuration, such as at a point, in a line, or on a surface. In addition, except for the first sealing part 7, the conductor 20 may be or may not be in contact with or in the closest proximity to an outer surface of the light emitting part 6 or of the second sealing part 8 in any configuration, such as at a point, in a line, or on a surface. As a matter of course, in the areas excluding the contact restriction area, the conductor 41 may be attached being wound around the arc tube 5, or simply along the arc tube 5 linearly. In other words, in the areas excluding the contact restriction area, the conductor 41 may be attached to the arc tube 5 in any configuration.

As shown in an example of FIG. 8, the conductor 41 has a wound part 42 being wound around the first sealing part 7 substantially 2.5 turns. In addition, it is desirable that the wound part 42 has been wound in a loop with an inner diameter thereof smaller than an outer diameter of the first sealing part 7. It is desirable that when the wound part 42 is fitted over the first sealing part 7, the inner diameter of the wound part 42 is expanded. Thus, the portion of the conductor 41 being in contact with the outer surface of the first sealing part 7 is pressed against the outer surface of the first sealing part 7 by resilience in a shrinking direction of the inner diameter of wound part 42. As a result, dislocation of the conductor 41 with regard to the first sealing part 7 can be prevented.

In the above example, the description is made when the conductor 41 is made of alloy of iron and chromium. Note that, however, in addition to iron and chromium, the conductor 41 may be made of a metal wire made of molybdenum and the like. In addition, the U-shaped bending point of the conductor 41 may be "substantially in a V shape." The substantially V-shaped bending point may be in contact with or in the closest proximity to the outer surface of the first sealing part 7 substantially at a single point in the contact restriction area. It is sufficient that at least the point of the conductor 41 bent substantially in a U or V shape is in a linear shape. The remaining portion may be in a belt-like shape, for example.

According to the high-pressure discharge lamp system of Embodiment 2 having the above features, as with the high-pressure discharge lamp system 1 of Embodiment 1, when a high-frequency voltage at a predetermined frequency in the range from 10 [kHz] to 10 [MHz], inclusive, is applied between the first and the second electrodes 10 and 11, the following effects can be obtained. (1) First, glass of the first sealing part 7 between the portion of the conductor 41 electrically connected to the second electrode 11 and the first metal foil 16 becomes dielectrically polarized. Furthermore, since the first metal foil 16 is adhered to the glass, which is to say, since there is no space causing the decrease in the dielectric polarization between the conductor 41 and the first metal foil 16, the glass can be strongly polarized. (2) Secondly, since the portion of the conductor 41 is in contact with or in the closest proximity to the outer surface of the first sealing part 7 substantially at a single point in the contact restriction area, extremely remarkable inequality occurs thereby creating density in the electric field between the portion of the conductor 41 and the outer surface (glass surface) of the first sealing part 7. (3) Thirdly, the high-frequency voltage is applied to the conductor 41, which accelerates the electron emission from the conductor 41. Consequently, even though the voltage applied between the substantially U-shaped or V-shaped portion of the conductor 41 and the first metal foil 16 is extremely low, for example, 1.5 [kV]-2.0 [kV], inclusive, as a synergetic effect, the electrons are emitted from the substantially U-shaped or V-shaped portion of the conductor 41. Due to the electron emission, mainly nitrogen in the air between the substantially U-shaped or V-shaped portion of the conductor 41 and the outer surface (glass surface) of the first sealing part 7 is ionized, thereby causing creeping discharge or corona discharge. When the nitrogen is being ionized, ultraviolet rays with wavelength of 100 [nm]-400 [nm], inclusive, are radiated. The ultraviolet rays pass through the glass of the first sealing part 7 and radiate a metal material, such as mercury that is a light-emitting material generally enclosed and the first and second electrodes 10 and 11, within the discharge space 9. Due to photoelectric effect, photoelectrons inside the discharge space 9 can be increased. Accordingly, these photoelectrons promote dielectric breakdown between the first and the second electrodes 10 and 11. Without the use of conventional radioactive material, the lamp can be activated with an extremely low starting voltage (e.g. 3.0 [kV] or less). Thus, the low-cost high-pressure discharge lamp system 1 activated with a low starting voltage can be realized.

Even if the conductor 41 is disposed in an area of the outer surface of the first sealing part 7 corresponding to other metal member, such as the electrode bar 12, than the first metal foil 16, although glass between the conductor 41 and the electrode bar 12 is still dielectrically polarized, note the polarization is weaker than the aforementioned polarization, because air foam is generated in the periphery of the electrode bar 12.

Particularly, the frequency of the high-frequency voltage is desirably 200 [kHz] or more. When the high-frequency voltage is applied, the electrons emission from the conductor 41 can be further accelerated.

Embodiment 3

The following describes a projector in accordance with Embodiment 3 of the present invention, with the reference to FIGS. 10 and 11.

FIG. 10 shows an outline structure of a front projector 43 by way of example of a projector using the high-pressure discharge lamp system 1 of Embodiment 1. The front projector 43 is a type of a projector that projects an image toward a screen (unshown) placed forward thereof.

Note that FIG. 10 shows a housing 44, which is described later, of the projector 43 when a top board of the housing 44 is removed.

The front projector 43 includes the lamp unit 23 that is a light source, a control unit 46, a projection lens 47, a cooling fan unit 48, a power supply unit 49 and the like that are contained in the housing 44. The lamp unit 45 includes an image forming unit for forming an image by polarizing incoming light, a photosynthesis unit that synthesizes light projected from the image forming unit, an illumination unit that projects light radiated from the lamp unit 23 to the image forming unit (each unshown). The illumination unit has a color filter or the like of three primary colors (unshown), and performs color separation of the light into the three primary colors and projects the light to the image forming unit. The photosynthesis unit synthesizes light separated into three primary colors, thereby obtaining a full-color image. The control unit 46 controls driving of the image forming unit and the like. The projection lens 47 expands optical images synthesized by the photosynthesis unit for projection display. The power supply unit 49 includes the aforementioned lighting circuit 3, and properly converts and feeds electricity fed from a commercial power supply to the control unit 46 and the lamp unit 23.

The high-pressure discharge lamp system 1 of Embodiment 1 may be used as a light source of a rear projector 50 by way of example of a projector shown in FIG. 11. The rear projector 50 includes the lamp unit 23, an optical unit, a projection lens, a minor, a high-pressure discharge lamp lighting device (each unshown) that are contained in a housing 51. An image reflected from the mirror and projected by the projection lens is projected from a rear side of a transmissive screen 52 and is displayed.

Described as above, with the structure of the projector in accordance with Embodiment 3 of the present invention, a low-cost projector can be realized.

In Embodiment 3, the description of the high-pressure discharge lamp system is made on a case in which the high-pressure discharge lamp system 1 of Embodiment 1 is employed. Note that the operation effect similar to the above can be achieved when the high-pressure discharge lamp system 1 in accordance with Embodiment 2 is used.

In the above embodiments, the description is made on a case in which a high-pressure mercury lamp 4 having a rated electricity of 165 [W] is used as the high-pressure mercury lamp. However the present invention is not limited to this. If a high-pressure mercury lamp with a rated electricity within a range between 100 [W]-400 [W], inclusive, is used, the operation effect similar to the above can also be achieved.

INDUSTRIAL APPLICABILITY

The present invention can be used in an application that needs to be activated without using a radioactive material and with a low starting voltage.

The invention claimed is:

1. A high-pressure discharge lamp system having a high-pressure discharge lamp and a lighting circuit that operates the high-pressure discharge lamp, the high-pressure discharge lamp comprising:
    a glass envelope including a light emitting part having a discharge space formed therein and a first and a second sealing part oppositely extending from the light emitting part;
    a first electrode having one end located within the discharge space and another end connected to a first metal foil sealed within the first sealing part;
    a second electrode having one end located within the discharge space and another end connected to a second metal foil sealed within the second sealing part; and
    a conductor electrically connected to the second electrode and disposed externally of the envelope, wherein
    a portion of the conductor is in contact with or in closest proximity to an outer surface of the first sealing part substantially at a single point, the single point being located in an area of the outer surface that corresponds to the first metal foil and that excludes areas of the outer surface sandwiched between two virtual planes each containing one main surface of the first metal foil, and
    the lighting circuit activates the high-pressure discharge lamp by placing a high-frequency voltage at a predetermined frequency between the first and the second electrodes, the predetermined frequency falling within a range from 10 kHz to 10 MHz, inclusive.

2. The high-pressure discharge lamp system of claim 1, wherein
    the conductor is made of a metal wire, and the portion of the conductor is one end of the metal wire.

3. The high-pressure discharge lamp system of claim 1, wherein
    the conductor is made of a metal wire having a bent portion substantially in a U shape or in a V shape, and
    the portion of the conductor is a bending point of the bent portion.

4. The high-pressure discharge lamp system of claim 1, wherein
    the portion of the conductor is in contact with the outer surface of the first sealing part,
    the conductor has a wound part being wound around the first sealing part and being out of contact with the outer surface,
    the wound part has an inner diameter smaller than an outer diameter of the first sealing part, and is fitted over the first sealing part with the inner diameter of the wound part being expanded, and
    the portion is pressed against the outer surface of the first sealing part by resilience caused by shrinking force of the inner diameter of the wound part.

5. The high-pressure discharge lamp system of claim 1, wherein the frequency is 200 kHz or higher.

6. A projector having the high-pressure discharge lamp system as defined in claim 1.

7. The high-pressure discharge lamp system of claim 1, wherein
the conductor is made of a metal wire, and the portion of the conductor is one end of the metal wire.

8. The high-pressure discharge lamp system of claim 1, wherein
the conductor is made of a metal wire having a bent portion substantially in a U shape or in a V shape, located above the first metal foil, and
the portion of the conductor is a bending point of the bent portion.

9. The high-pressure discharge lamp system of claim 1, wherein
the portion of the conductor is in contact with an outer surface of the first sealing part,
the conductor has a wound part being wound around the first sealing part and being out of contact with the outer surface.

10. The high-pressure discharge lamp system of claim 1, wherein
the frequency is 200 kHz or higher and the first metal foil and first sealing glass are dielectrically polarized and an air space, between the first sealing glass and the conductor, enables a corona discharge for emitting ultraviolet rays into the discharge space to provide a lamp system activation at approximately 2000 volts or less.

11. A high-pressure discharge lamp system having a high-pressure discharge lamp and a lighting circuit that operates the high-pressure discharge lamp, the high-pressure discharge lamp comprising:
a glass envelope including a light emitting part having a discharge space formed therein and a first and a second sealing part oppositely extending from the light emitting part;
a first electrode having one end located within the discharge space and another end connected to a first metal foil sealed within the first sealing part;
a second electrode having one end located within the discharge space and another end connected to a second metal foil sealed within the second sealing part; and
a conductor electrically connected to the second electrode and disposed externally of the envelope, wherein a portion of the conductor is in contact with or in closest proximity to an outer surface of the first sealing part such that a minimum distance between the surface of the first sealing part approaches a range of 0.3 mm or less; and
wherein the lighting circuit activates the high-pressure discharge lamp by placing a high-frequency voltage at a predetermined frequency between the first and the second electrodes, the predetermined frequency falling within a range from 10 kHz to 10 MHz, inclusive.

12. A high-pressure discharge lamp system having a high-pressure discharge lamp and a lighting circuit that operates the high-pressure discharge lamp, the high-pressure discharge lamp comprising:
a glass envelope including a light emitting part having a discharge space formed therein and a first and a second sealing part oppositely extending from the light emitting part;
a first electrode having one end located within the discharge space and another end connected to a first metal foil sealed within the first sealing part;
a second electrode having one end located within the discharge space and another end connected to a second metal foil sealed within the second sealing part; and
means for providing a corona discharge in ambient air with a conductor electrically connected to the second electrode and disposed externally of the envelope so that a portion of the conductor that is one of (a) in contact with and (b) in close proximity to an outer surface of the first sealing part containing the first metal foil enables a corona discharge from that portion of the conductor in an ambient air space surrounding the conductor to emit ultraviolet rays into the discharge space of the glass envelope for an initial activation of the lamp system at approximately 3000 volts or less when a predetermined frequency is applied.

13. The high-pressure discharge lamp system of claim 12 wherein the lighting circuit activates the high-pressure discharge lamp by placing a high-frequency voltage at the predetermined frequency between the first and the second electrodes, the predetermined frequency falling within a range from 10 kHz to 10 MHz, inclusive.

14. The high-pressure discharge lamp system of claim 12, wherein the frequency is 200 kHz or higher.

15. A projector having the high-pressure discharge lamp system as defined in claim 12.

* * * * *